Nov. 27, 1951 T. L. HIBBARD ET AL 2,576,343
AUTOMOBILE SEAT CONSTRUCTION
Filed June 6, 1946 5 Sheets-Sheet 1

T.L. HIBBARD
S.J. GALLA
INVENTORS

BY
ATTORNEYS.

Nov. 27, 1951  T. L. HIBBARD ET AL  2,576,343
AUTOMOBILE SEAT CONSTRUCTION
Filed June 6, 1946  5 Sheets-Sheet 2
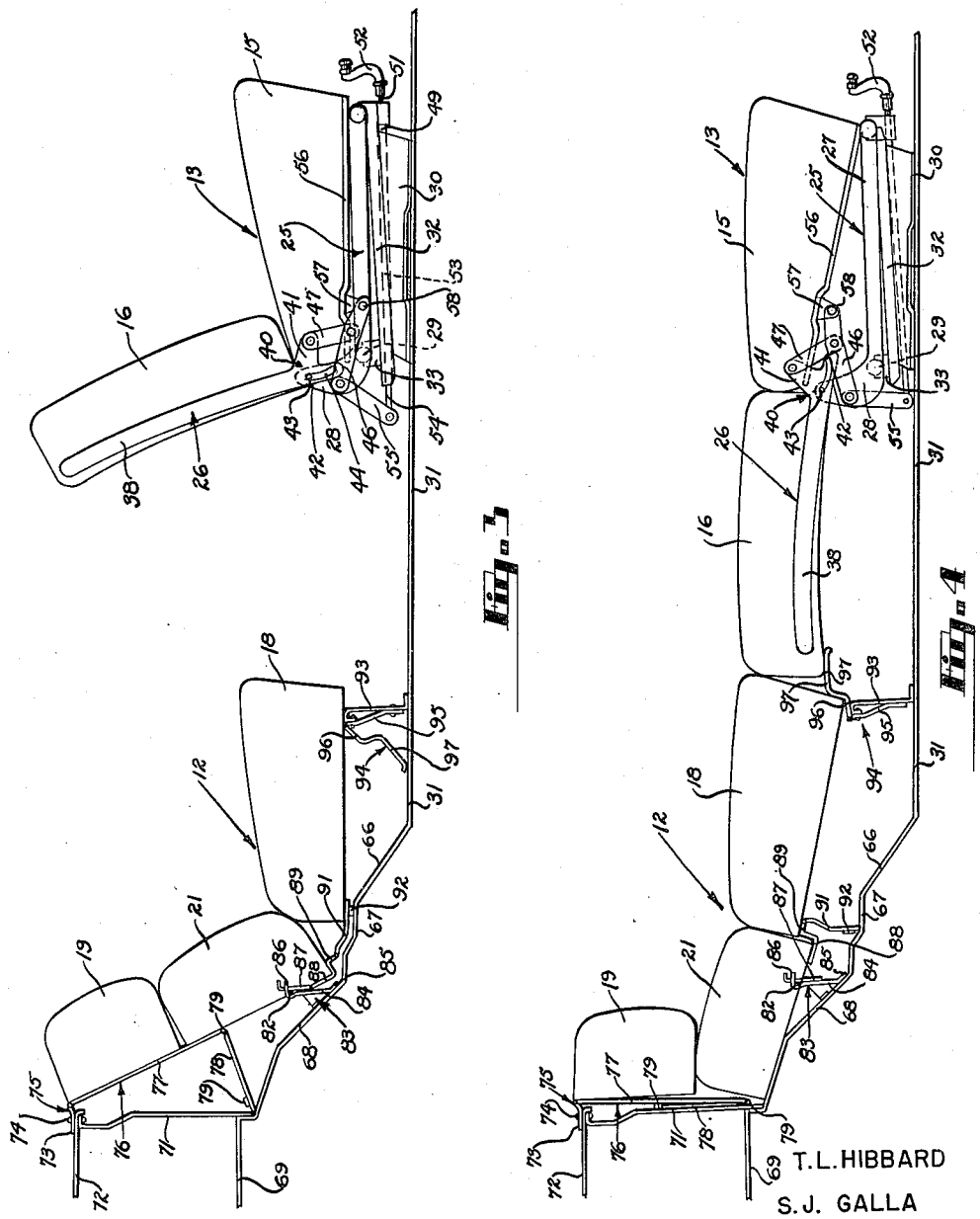
T. L. HIBBARD
S. J. GALLA
INVENTORS
BY
ATTORNEYS.

Nov. 27, 1951    T. L. HIBBARD ET AL    2,576,343
AUTOMOBILE SEAT CONSTRUCTION
Filed June 6, 1946    5 Sheets-Sheet 3

T. L. HIBBARD
S. J. GALLA
INVENTORS

BY
ATTORNEYS.

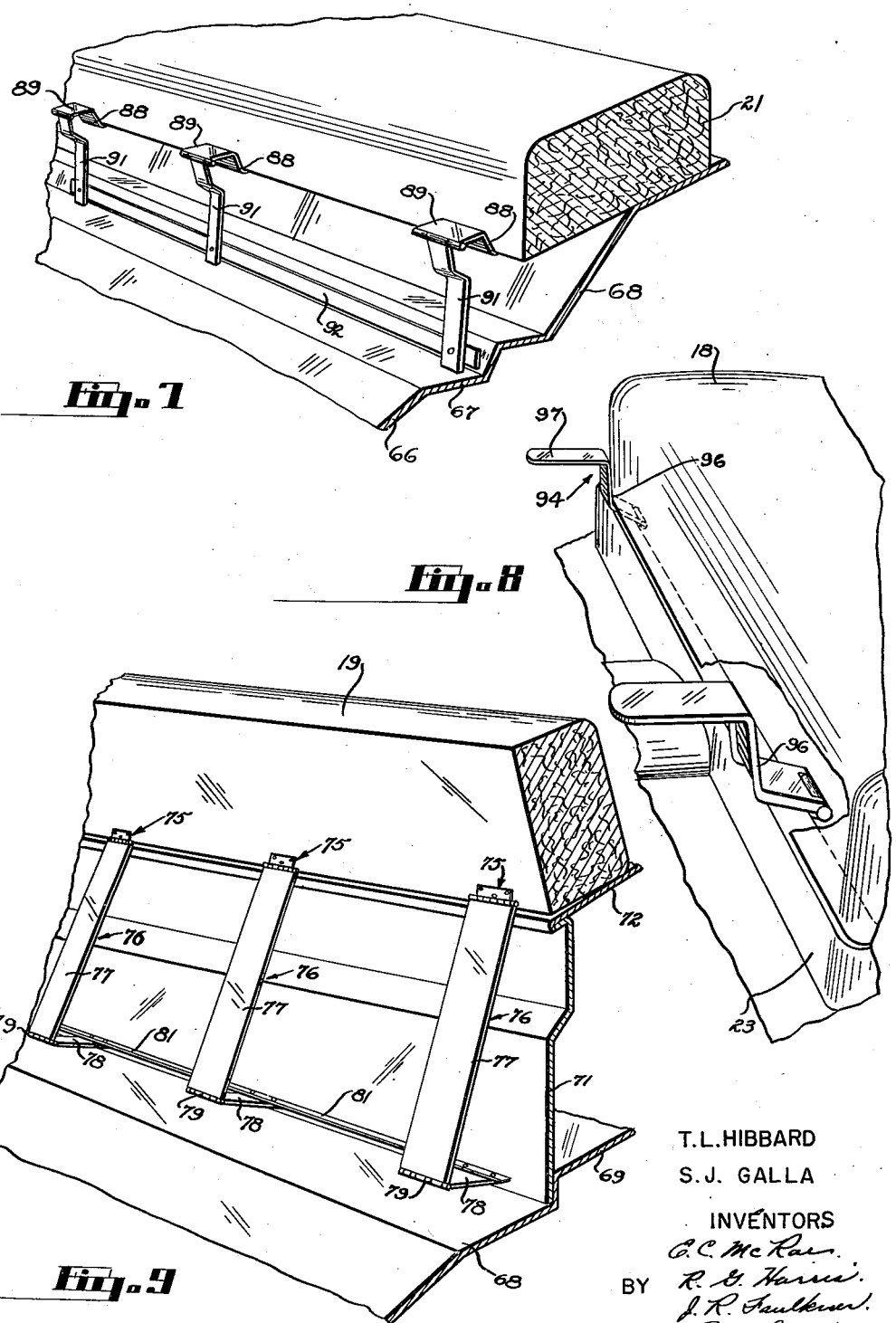

UNITED STATES PATENT OFFICE 2,576,343

AUTOMOBILE SEAT CONSTRUCTION

Thomas L. Hibbard, Birmingham, and Stephen J. Galla, Detroit, Mich., assignors to Ford Motor Company, Dearborn, Mich., a corporation of Delaware Application June 6, 1946, Serial No. 674,828

4 Claims. (Cl. 155—7)

This invention relates generally to automobile seat construction and refers more particularly to automobile seats adapted to be readily converted into a bed.

Traveling, both for recreational and for business purposes, has become common practice with the average American. A large portion of this travel is by automobile, and one of the most serious problems confronting the motorist has been that of finding adequate overnight accommodations. Hotels, tourist camps and trailers each fill a portion of the requirements but for various reasons are not always satisfactory. Reservations in hotels and tourist camps may be difficult to obtain, and their locations may not be entirely suitable or among the most pleasant surroundings. House trailers are cumbersome and unwieldy during traveling on the road, and finding a suitable location where overnight parking of a trailer will be permitted is often difficult. With the present invention the need for reliance upon the above-mentioned facilities is eliminated, and the traveler is given a wide latitude in choice of location for an overnight stop since it is only necessary that he find a convenient place for parking his automobile.

It is therefore a primary object of the present invention to provide front and rear automobile seats in an automobile of the two-door, four-door, sport sedan or other similar type, which may be readily converted from use for normal driving purposes to use as a double size, full length bed for sleeping purposes. Although it is recognized that in the past certain other constructions have been proposed for this purpose, it is believed that the present construction embodies many advantages not heretofore attained. For example, the present construction detracts in no way from the comfort and appearance of the seats during normal use while driving, yet easily and quickly converts into a full size bed rivaling the comfort of normal beds. Soft, comfortable springs can be incorporated into the seats, and the latter are arranged so as to form a flat continuous surface. In addition, the construction is relatively simple and easy to manufacture, and the additional cost as compared with the cost of conventional automobile seats is not prohibitive. As desired, the convertible seats can be installed in the factory as standard or optional equipment, or can be provided as an accessory to replace normal seats at any time. Because of the simplicity of the construction there is little to get out of order, eliminating maintenance problems.

Another object of the present invention is to provide convertible seats for an automobile which not only can be converted into a bed for sleeping purposes, but which can be adjusted to provide reclining seats. This is rendered possible by the construction of the front seats as individual units so that the right front seat may be independently adjusted to a reclining position while the driver's seat remains in an upright position. A removable headrest is provided with the right front seat, and since the seat can be continuously adjusted between an upright position and a completely horizontal position, the passenger may choose the most comfortable adjustment for his particular needs. In addition, the driver's seat can also be adjusted to reclining positions, thus affording adjustment to the most comfortable driving angle and also enabling the driver's seat to be moved to a reclining position for resting during stops.

In addition to normal traveling and touring, the convertible seat construction is also advantageous for other uses. For example, it may be used as an emergency ambulance, or by doctors or nurses to carry injured persons or invalids, since a complete bed may be formed without altering the position of the driver's seat.

When using an automobile equipped with the present construction as a bed for sleeping purposes, additional privacy and comfort can be secured by providing curtains covering the windows and by utilizing screens such as shown in the co-pending application of Stephen J. Galla entitled "Window Screen," Serial No. 659,793, filed April 5, 1946, now Patent No. 2,568,800, granted September 25, 1951.

Still another object of the invention is to provide a front seat construction for an automobile in which the seats are individually operable and in which there is no interference with the normal operations of adjusting the seat longitudinally to accommodate persons of various sizes and tilting the back cushion of the seat forwardly to provide access to the rear seat in two-door body styles. The present front seat mechanism is easily operated, continuously adjustable, of sturdy and rigid tubular construction, and operates to pivot the back cushion downwardly and to simultaneously raise the seat cushion to provide a level continuous surface.

The construction of the rear seat is such that in appearance and comfort it is practically indistinguishable from the normal seat construction with the exception that the back cushion is divided. Adjustment of the rear seat to bed position is easily accomplished with a minimum of effort, and the brackets used to support the seat cushions in the latter position are easily moved to their operative positions, yet are completely concealed during normal use of the automobile.

Other objects and advantages of this invention will be made more apparent as this description proceeds, particularly when considered in connection with the accompanying drawings, wherein:

Figure 3 is a longitudinal side elevational view of the front and rear seats in their normal driving positions.

Figure 4 is a view similar to Figure 3 but showing the seats adjusted into position to form a bed.

Figure 7 is a fragmentary perspective view of a portion of the rear seat construction, showing particularly the intermediate supporting brackets.

Figure 8 is a fragmentary perspective view of the rear seat construction, showing particularly the lower supporting brackets.

Figure 9 is a fragmentary perspective view of the rear seat construction, showing particularly the upper support brackets.

Figures 10 to 15 inclusive are diagrammatic side elevational views showing the successive steps in converting the front and rear seats from normal driving position to bed position.

Figure 1:
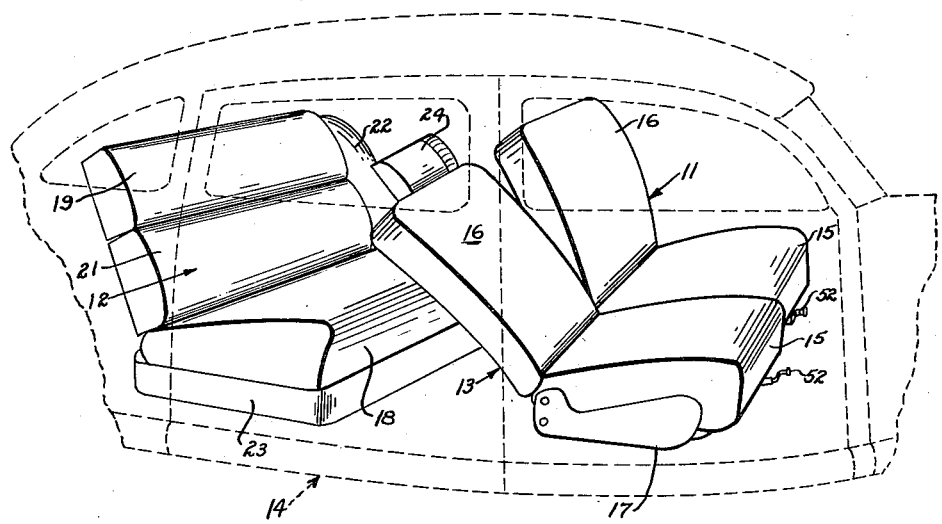
Figure 1 is a perspective view of front and rear seats embodying the present invention, with the outline of an automobile body shown diagrammatically in dotted lines.

Referring now more particularly to the drawings, it will be noted that Figure 1 illustrates the driver's seat 11 and the rear seat 12 in their normal driving positions, while the right front or passenger's seat 13 is shown in a partially reclined position. The automobile body 14 is shown diagrammatically in dotted outline and it will be understood that the seats of the present invention can be used with various types of body constructions, such as with two-door sedans, four-door sedans, sport sedans, and other styles.

Inasmuch as the driver's seat 11 and the front passenger seat 13 are identical in construction, throughout this specification only one will be described in detail. Each includes a seat cushion 15 and a normally upright back cushion 16. Suitable trim panels 17 are mounted adjacent the outer sides of the seat cushions 15, to cover the working mechanism of the seat and conceal the space beneath the seat. The rear seat 12 comprises a seat cushion 18 and upper and lower rear cushions 19 and 21 respectively. The various cushions mentioned above may be constructed according to conventional practice and include suitable springs properly joined together and covered with upholstery material. Stationary arm rests 22 are provided on opposite sides of the rear seat 12, and the supporting structure for the seat cushion 18 is concealed by a trim strip 23 beneath the seat cushion.

Figure 2:
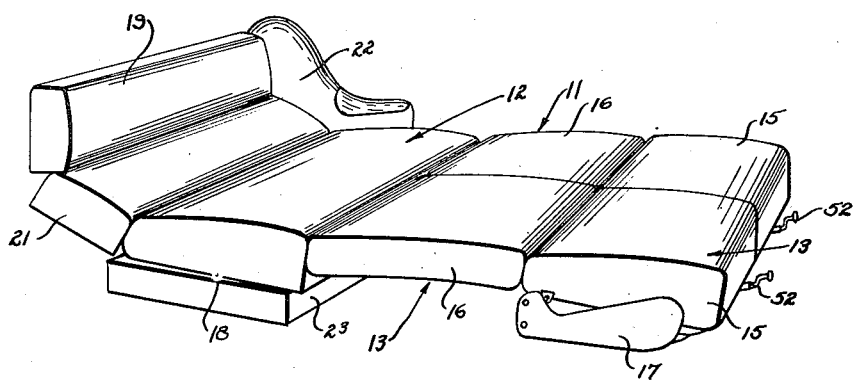
Figure 2 is a perspective view of the construction shown in Figure 1 with the seats converted into a bed.

In Figure 1 the front passenger seat 13 is shown in a partially reclined position to enable the passenger to rest during traveling. To add to his comfort, a removable headrest 24 is provided and forms a continuation of the back cushion 16. In Figure 2 the front and rear seats are shown converted into a double size, full length bed and it will be noted that the back cushions 16 of the front seats have been lowered to a horizontal position and that the rearward portions of the seat cushions 15 have been raised to provide a substantially horizontal surface. This is necessary since conventionally the front seat cushions slope slightly downwardly in a rearward direction to obtain maximum seating comfort. It will also be noted that the rear seat cushions 18 have been moved slightly forwardly and the rear edge thereof raised so that the upper surface of the seat is horizontal, and also that the lower back cushion 21 has been shifted to a substantially horizontal position. Thus, the cushions 15, 16, 18 and 21 form a bed.

Figure 5:
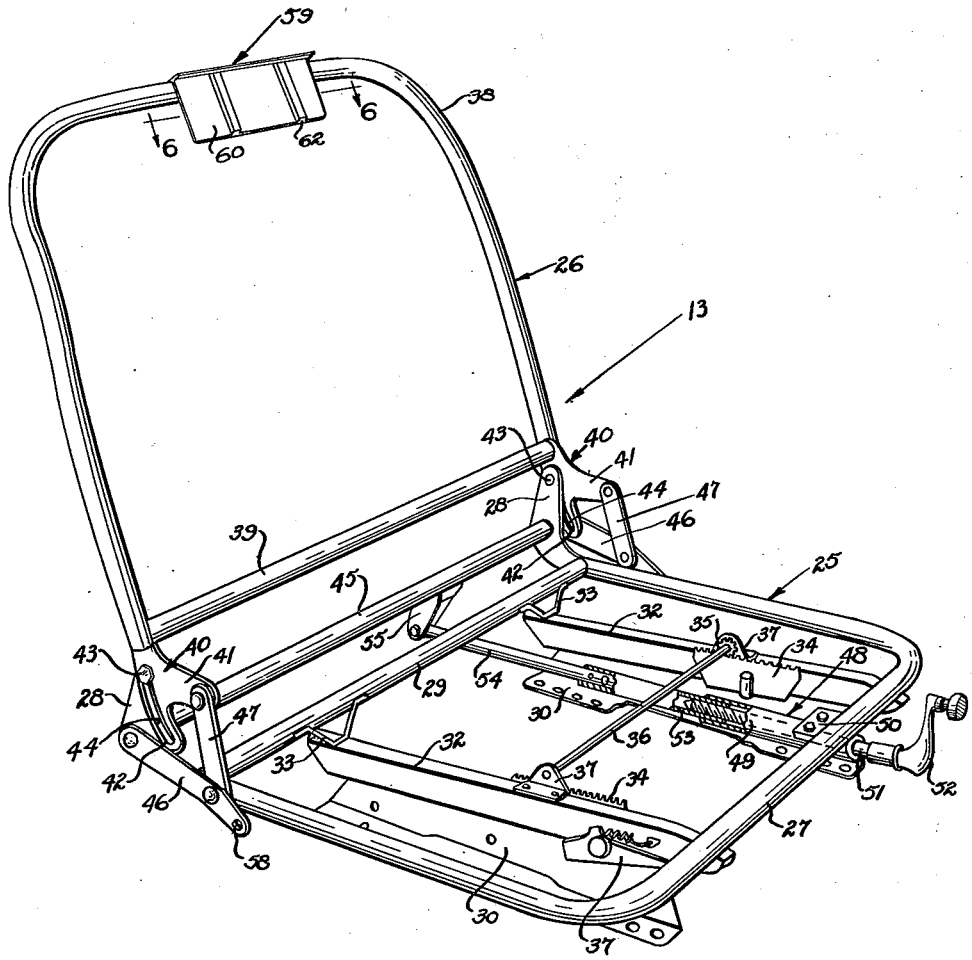
Figure 5 is a perspective view of one of the front seats with the cushions removed.

Inasmuch as the front seats 11 and 13 may be used in combination with the rear seat 12 to form a bed, and may also be used independently of the rear seat to form individual reclining seats, the construction of the front seats will be described first. Reference is made particularly to Figure 5, which shows the frame of one of the front seats with the cushions 15 and 16 removed, and also to Figures 3 and 4 which show the relative positions of the various parts of the front seat in both the normal position and the lowered bed position.

Each front seat has a lower frame 25 for supporting the seat cushion 15 and an upper frame 26 for supporting the back cushion 16. The lower frame 25 is of tubular construction and comprises a generally U-shaped frame member 27. A pair of upwardly extending flat plates 28 are welded to the ends of the frame member 27, and a transverse tubular brace 29 extends between the sides of the frame member 27, being welded thereto at opposite ends. The lower frame 25 is mounted upon a supporting structure of the rail and slide type such as is conventionally used in connection with adjustable front seats. The supporting structure includes a pair of upright rails 30 spaced transversely and mounted upon the floor 31 of the automobile body. The upper edges of the rails 30 are embraced by slides 32 which are slideably mounted thereon by any suitable means, such as rollers (not shown) or the like. The lower frame 25 is mounted upon the slides 32, being connected thereto by brackets 33 depending from the transverse brace 29 and welded or otherwise suitably secured to the rearward ends of the slides, the forward side of the U-shaped frame member 27 being welded to the forward ends of the slides. It will thus be seen that the slides and rails permit longitudinal adjustment of the seat frame 25 to accommodate persons of various sizes. Simultaneous movement of opposite sides of the seat is insured by a seat adjusting structure of the conventional type including racks 34 secured to the rails 30 and cooperating pinions 35 mounted at opposite ends of a cross shaft 36, the opposite ends of the latter being journaled in brackets 37 carried by the slides 32. The slides 32 are locked in their adjusted positions by means of a locking lever 37' which may be readily released when it is desired to adjust the seat longitudinally.

The upper seat frame 26 likewise comprises a U-shaped tubular frame member 38 strengthened by a transversely extending tubular brace 39. The lower ends of the U-shaped frame member 38 have secured thereto flat bifurcated plates 40 each having diverging arms 41 and 42. The upper seat frame 26 is pivotally mounted upon the lower seat frame 25 by means of a pair of pivot bolts 43 extending through the upper ends of the plates 28 of the lower seat frame 25 and the plates 40 of the upper seat frame 26. It will be noted that the arms 42 of the bifurcated flanges 39 are provided with arcuate slots 44 and that the bolts 43 pass through the upper ends of the slots. As will be explained more in detail later, the slots 44 permit the upper seat frame 26 to be pivoted forwardly to provide access to the rear seats of vehicles of the two-door type.

A cross shaft 45 is journaled in the upright plates 28 of the lower frame 25. The opposite ends of the cross shaft 45 extend through and a slight distance beyond the plates 28 and carry at their extremities actuating levers 46. The outer ends of the actuating levers 46 are connected to the ends of the arms 41 by means of links 47. It will now be apparent that pivotal movement of the cross shaft 45 operates the actuating levers 46 and the interconnecting links 47 and results in rearward and downward pivotal movement of the upper seat frame 26 about the pivot bolts 43. Rotation of the cross shaft 45 is accomplished by means of a telescopic adjuster 48 of the screw type. The adjuster 48 includes a tubular housing 49 mounted upon the front portion of the U-shaped frame member 27 by means of a bracket 50 and a threaded adjusting rod 51 journaled in the housing 49 and rotated by means of a crank 52. The adjusting rod 51 engages a tapped hollow tube 53 which in turn is secured by a connecting rod 54 to an arm 55 welded to the cross shaft 45. Actuation of the handle 52 is thus effective to retract or extend the tube 53 with respect to the tubular housing 49 and to rotate the cross shaft 45 to raise or lower the upper seat frame 26 about the pivots 43.

As best seen in Figures 3 and 4, the seat cushion 15 is supported upon a sub frame 56 which has depending therefrom a pair of brackets 57 on opposite sides of the frame. The brackets 57 are pivotally connected to the extreme outer ends of the actuating levers 46 by the pivot pins 58. The front portion of the sub frame 56 of the front seat cushion slideably rests upon the front portion of the U-shaped frame member 27, and it will be readily seen that as the actuating lever 46 is swung upwardly during the movement of the upper frame 26 to its lowered position the rearward portion of the seat cushion 15 is simultaneously raised to assume a substantially horizontal position as shown in Figure 4.

Figure 6:
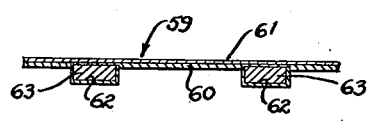
Figure 6 is a cross sectional view on the line 6—6 of Figure 5.

A supporting bracket 59 for the headrest 24 is welded to the upper portion of the upper seat frame 26 and, as best seen in Figure 6, is formed of a pair of stampings 60 and 61 welded together and formed to provide a pair of vertically extending slots 62 for receiving the supporting legs 63 depending from the headrest.

The construction of the rear seat 12 will now be described. The floor 31 of the body extends rearwardly under the rear seat and is so shaped as to provide, in succession, an upwardly inclined portion 66, a horizontal ledge 67, an upwardly inclined portion 68 and a horizontal portion 69 forming the rear deck floor. Extending upwardly from the junction between the inclined portion 68 and the rear deck floor 69 is a vertical partition 71, the upper end of which is joined to a horizontally extending panel 72 forming a luggage shelf back of the rear seat. Three transversely spaced brackets 73 are mounted at the juncture between the partition 71 and the panel 72 by means of bolts 74, as best seen in Figures 3, 4 and 9. The brackets 73 form part of hinges 75 which serve to pivotally mount the upper rear cushion 19 to permit the latter to be swung upwardly as well as downwardly from its normal position. In addition, the hinges 75 vertically support the upper ends of the collapsible brackets 76. As seen in Figure 9, each of the three collapsible brackets 76 includes an upper bar 77 and a lower bar 78 pivotally connected together at 79. To enable the three brackets 76 to be operated simultaneously, the free ends of the lower bars 78 are joined together by a transversely extending brace 81. In the normal position of the brackets 76, as shown in Figures 3 and 9, the brackets are extended so that the upper bars 77 form supports for the upper rear cushion 19 and the lower rear cushion 21, the free ends of the lower bars 78 being seated in the corner formed between the inclined portion 68 of the floor and the vertical partition 71. These brackets are adapted, however, to be collapsed to the position shown in Figure 4, in which the upper and lower bars 77 and 78 are folded flat against the vertical partition 71.

The lower rear cushion 21 is mounted for pivotal movement about a transversely extending rod 82 which is suitably secured to the frame of the cushion. Three transversely spaced pivotal supports 83 are provided for pivotally supporting the rod 82 and the cushion 21. Each pivotal support 83 comprises a vertically extending bracket 84 provided at its lower end with a flange 85 welded to the inclined portion 68 of the floor and at its upper end with a retaining flange 86. A second bracket 87 is bolted to each of the vertical brackets 84 and cooperates with the brackets 84 and the flanges 86 to form journals for the rod 82. It will be apparent from Figures 3 and 4 that the lower seat cushion 21 is thus pivotally mounted for swinging movement between the substantially upright position shown in Figure 3 and the substantially horizontal position shown in Figure 4.

As best seen in Figures 3, 4 and 7, three laterally spaced brackets 88 are suitably secured to the underside of the lower seat cushion 21 at the forward edge thereof. The brackets 88 extend forwardly beyond the cushion, being bent upwardly and formed with seating portions 89, at the outer ends of which are pivotally mounted brackets 91. The lower ends of the brackets 91 are joined together by a transversely extending brace 92 to permit all three brackets to be operated in unison. In the normal position of the rear seat, as shown in Figure 3, the brackets 91 rest upon a ledge 67 and form supports for the rear portion of the rear seat cushion 18. As seen in Figure 4, when the lower rear cushion 21 is pivoted to a substantially horizontal position, the brackets 91 are swung downwardly so that the lower ends thereof rest upon the ledge 67. In this position, the seating portions 89 of the brackets 88 form supports for the rear portion of the rear seat cushion 18, raising the latter so that the upper surface thereof is substantially horizontal. It will be noted that during the normal position of the rear seat cushion 18, the forward portion of the latter rests upon a vertical supporting panel 93 extending upwardly from the floor 31. The trim strip 23, previously mentioned, is secured to the outer surface of the panel 93.

Figures 3, 4 and 8 illustrate the lower brackets 94 which are normally concealed beneath the rear seat cushion 18 but which may be swung outwardly to form supports for the upper portion of the back cushion 16 of the front seats 11 and 13. Each bracket 94 comprises a plate 95 bolted upon the inner surface of the vertical panel 93 and an arm 96 pivotally connected to the upper end of the plate 95. The arm 96 is provided with an offset portion 97 adapted to support the rear edge of the cushions 16 when in the position shown in Figure 4. At the same time, the forward portion of the rear seat cushion 18 also rests upon the arms 96.

Figure 10:
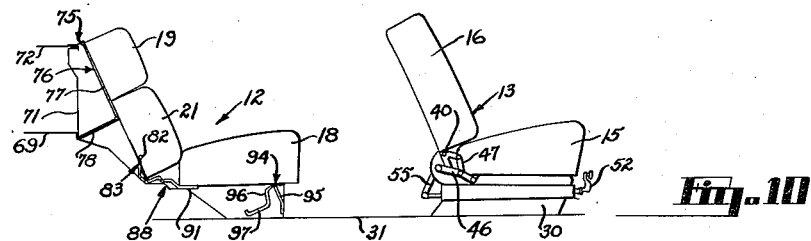

Figures 10 to 15 show diagrammatically the successive steps necessary to convert the front and rear seats into a full length, double size bed. In Figure 10 the front seat 13 and the rear seat 12 are shown in their normal position. It will be seen that in this position the various brackets which adjustably support the cushions 18, 19 and 21 of the rear seat are completely concealed by the cushions and consequently do not detract from the appearance of the vehicle.

Figure 11:
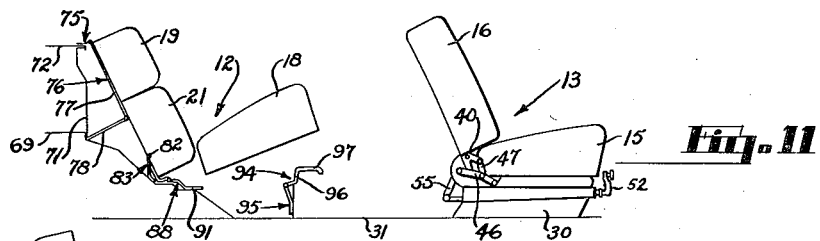

The first step in converting the seats into a bed is shown in Figure 11, in which the rear seat cushion 18 is lifted bodily upwardly and forwardly and the arms 96 of the brackets 94 are swung outwardly. Seat cushion 18 is subsequently temporarily supported upon the brackets 94 as shown in Figure 12.

Figure 12:
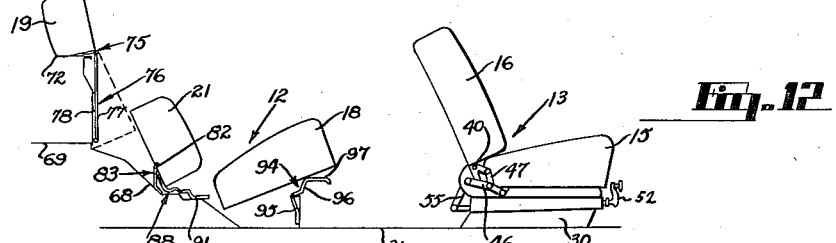

The next step is to raise the upper rear cushion 19 about the hinges 75 to the position shown in Figure 12 in which the cushion 19 rests upon the shelf 72, and then to collapse the upper brackets 76 and fold the latter flat against the partition 71.

Figure 13:
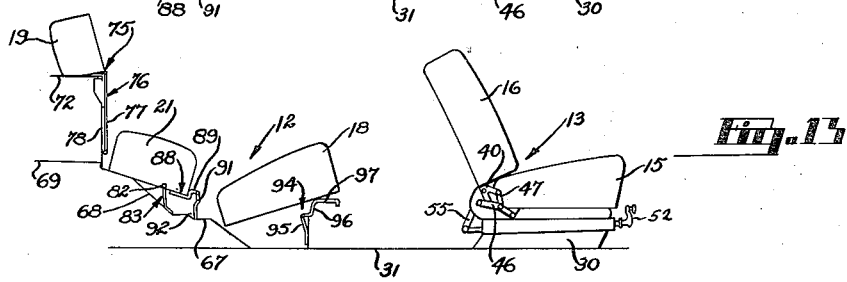

Figure 13 illustrates the next step, which comprises swinging the lower rear cushion 21 about the pivotal axis formed by the rod 82 and the pivotal supports 83 to a substantially horizontal position. At the same time, the brackets 91 are swung to a substantially vertical position such that the lower edges thereof rest upon the ledge 67. Inasmuch as the three brackets 91 are connected together by the transverse brace 92, they may be simultaneously moved to the position shown in Figure 12 in one operation.

Figure 14:
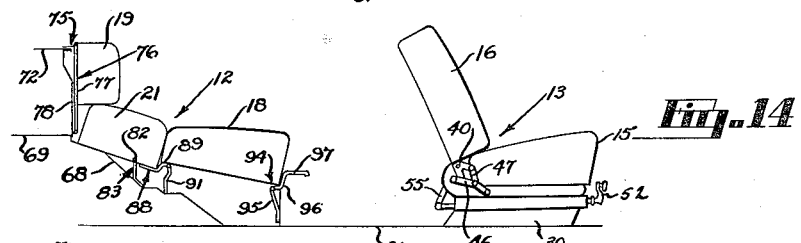

Following this, the rear seat cushion 18 is bodily lifted to the position shown in Figure 14, in which the rearward edge thereof is supported upon the seating portions 89 of the brackets 88 and the forward edge thereof rests upon the arms 96. Figure 14 also illustrates the upper seat cushion 19 as being swung downwardly. In this position it forms a cushioned wall at the end of the bed, although if desired the upper cushion may be left in its raised position as shown in Figure 13. With the latter arrangement a greater length of the bed is available for use. Attention is invited to the fact that the lower cushion 21 is supported in a slightly inclined position to form a pillow-like portion at the head of the bed.

Figure 15:
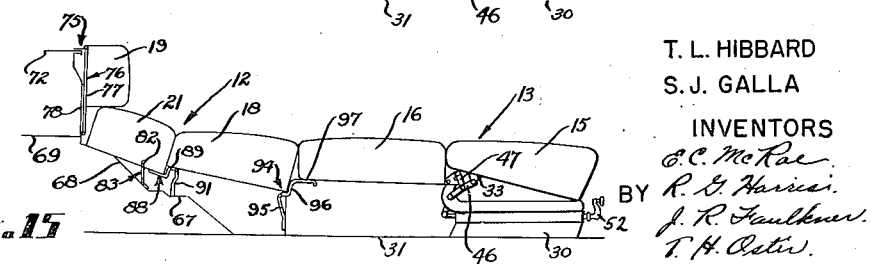

The final step is shown in Figure 15, in which the crank 52 has been operated to lower the upper frame 26 of the front seat and the back cushion 16 carried thereby to a horizontal position with the rearward edge of the cushion supported upon the offset portion 97 of the arms 96. As previously mentioned, the levers 46 of the front seat operating linkage are swung upwardly as the crank is operated to simultaneously raise the front seat cushion 15 to a horizontal position.

Attention is also invited to the fact that the construction of the present invention can be used with a coupé or with a station wagon as well as with the sedan type body illustrated in the drawings. When used with a coupé, the front seats are each equipped with headrests so that they can be used as reclining seats. Footrests may also be provided to add to the comfort of the passengers. If the coupé is of the five passenger type, the reclining front seats can be lowered until they rest upon the rear seat cushion, thus providing a firm support for the reclining seats. In the latter position the seats are nearly horizontal and when used with headrests and footrests serve as individual beds.

In lieu of the manually operated mechanism for lowering the back of the front seats, suitable hydraulic or electric power mechanism may be used to facilitate the operation of the seats.

From the foregoing it will be apparent that we have provided front and rear seats for an automobile which may be readily converted by a few simple operations from their normal upright positions to positions such that they form a full sized bed. It will also be noted that the back cushion 16 of the driver's seat 11 can be maintained in its upright normal driving position and the right front or passenger's seat 13 tilted backwardly to any desired reclining position for the comfort of the passenger. In addition, while still maintaining the driver's seat upright, the right front passenger seat and the rear seat may be converted into a partial bed at one side of the vehicle, so that injured persons or invalids may be transported comfortably and safely in emergencies. This arrangement, in fact, permits one passenger to sleep while the car is traveling. Due to the simplified construction, the cost of the convertible seats is not prohibitive, and is fully justified by the abovementioned uses and advantages, as well as others which will undoubtedly occur to the user.

It will be understood that the invention is not to be limited to the exact construction shown and described, but that various changes and modifications may be made without departing from the spirit and scope of the invention, as defined in the appended claims.

What is claimed is:

1. In a vehicular seat construction in which the front seat back is capable of reclining and forming with the back seat a substantially horizontal surface, a vertical panel secured to the vehicle floor adjacent to and parallel with the front edge of the rear seat, a bracket comprising a vertical leg member fastened to said vertical panel and a second leg member hinged to the first leg member at the level of the top of the vertical panel and capable of rotation into a position in which said second leg member can support the top edge of the front seat back in the completely reclining position, said second leg member being in turn supported upon the top of the vertical panel.

2. A vehicular seat construction which is readily converted from the usual riding position to a full size bed comprising a front seat having a seat and a seat back, the seat back being adjustable from a completely erect to a completely reclining position and a seat cushion supported at its rear by a linkage which raises and lowers the rear of the seat cushion as the seat back is moved from the erect to the reclining position and from the reclining to the erect position, and a back seat comprising a seat cushion, an upper back cushion and a lower back cushion, the front of the seat cushion being supported upon brackets which also support the top of the front seat back in the completely reclining position, the back of the seat cushion being supported on a bracket which also supports the lower edge of the lower back cushion, said lower back cushion being supported pivotally intermediate its top and bottom edges on a horizontal pin and at its upper end by a folding bracket which also supports the upper back cushion and said upper back cushion being supported on its rear face by said folding bracket and at its upper edge upon a hinge which also supports the said folding bracket.

3. A reclinable seat structure comprising an adjusting handle secured to an externally threaded screw, an internally threaded tube engaging the externally threaded screw and telescoping within a tubular housing, a connecting rod joining the internally threaded tube to an adjusting arm and securing the tube against rotation, a cross shaft supporting the adjusting arm and rotatable thereby, links rigidly secured to the ends of the cross shaft provided at the end remote from the cross shaft with an aperture arranged to receive a pin designed to support a seat cushion and provided intermediate its ends with a second link, and a seat back frame terminating at its lower end in a bifurcated member the upper tine of which is secured to said second link.

4. The structure recited in claim 3 in which the lower tine of the bifurcated member is provided with an arcuate slot the center of which coincides with the juncture between the upper tine of the bifurcated member and the second link.

THOMAS L. HIBBARD.
STEPHEN J. GALLA.

REFERENCES CITED

The following references are of record in the file of this patent:

UNITED STATES PATENTS

| Number | Name | Date |
| --- | --- | --- |
| 868,001 | Owen | Oct. 15, 1907 |
| 894,828 | Hale and Kilburn | Aug. 4, 1908 |
| 1,112,002 | Green | Sept. 29, 1914 |
| 1,427,292 | Hogan | Aug. 29, 1922 |
| 1,453,372 | Wong | May 1, 1923 |
| 1,681,979 | Graham | Aug. 28, 1928 |
| 1,788,088 | Fabio | Jan. 6, 1931 |
| 1,981,212 | Zeller | Nov. 20, 1934 |
| 2,178,923 | Stewart | Nov. 7, 1939 |
| 2,249,403 | Stollsteimer | July 15, 1941 |
| 2,324,902 | Benzick et al. | July 20, 1943 |

FOREIGN PATENTS

| Number | Country | Date |
| --- | --- | --- |
| 30,759 | Australia | Dec. 17, 1931 |
| 352,686 | Great Britain | July 16, 1931 |
| 833,437 | France | July 18, 1938 |